United States Patent
van der Weide et al.

(10) Patent No.: US 7,691,298 B2
(45) Date of Patent: Apr. 6, 2010

(54) PLASTIC CANTILEVERS FOR FORCE MICROSCOPY

(75) Inventors: Daniel W. van der Weide, Madison, WI (US); Charles A. Paulson, Clearlake, MN (US); Andrew G. Stevens, Dundas, MN (US)

(73) Assignee: Wisconsin Alumni Research Foundation, Madison, WI (US)

( * ) Notice: Subject to any disclaimer, the term of this patent is extended or adjusted under 35 U.S.C. 154(b) by 1446 days.

(21) Appl. No.: 11/041,886

(22) Filed: Jan. 21, 2005

(65) Prior Publication Data

US 2006/0163767 A1  Jul. 27, 2006

(51) Int. Cl.
*B29C 67/00* (2006.01)

(52) U.S. Cl. .................. 264/102; 264/225; 264/236

(58) Field of Classification Search .......... 264/101, 264/219, 220, 225, 239, 236; 425/542; 606/131
See application file for complete search history.

(56) References Cited

U.S. PATENT DOCUMENTS

| | | | | |
|---|---|---|---|---|
| 3,472,809 A * | 10/1969 | Hardman | ................ | 524/714 |
| 4,853,934 A * | 8/1989 | Sakurai | ................ | 372/29.011 |
| 4,859,394 A * | 8/1989 | Benton et al. | ................ | 264/225 |
| 4,859,934 A * | 8/1989 | Gale et al. | ................ | 324/76.56 |
| 5,272,913 A * | 12/1993 | Toda et al. | ................ | 73/105 |
| 6,103,305 A | 8/2000 | Friedmann et al. | | |
| 6,245,204 B1 * | 6/2001 | Lindsay et al. | ................ | 204/400 |
| 6,342,178 B1 * | 1/2002 | Matsuoka et al. | ........... | 264/496 |
| 6,422,077 B1 | 7/2002 | Krauss et al. | | |
| 6,523,392 B2 * | 2/2003 | Porter et al. | ................ | 73/24.01 |
| 6,613,601 B1 | 9/2003 | Krauss et al. | | |
| 6,663,820 B2 * | 12/2003 | Arias et al. | ................ | 264/225 |
| 6,872,439 B2 * | 3/2005 | Fearing et al. | ................ | 428/99 |
| 6,899,838 B2 * | 5/2005 | Lastovich | ................ | 264/102 |
| 7,238,316 B2 * | 7/2007 | Trajkovska-Petkoska et al. | ................ | 264/482 |
| 7,431,970 B1 * | 10/2008 | Lyuksyutov et al. | ........ | 427/256 |
| 2002/0164604 A1 * | 11/2002 | Abbott et al. | ................ | 435/6 |
| 2004/0180075 A1 * | 9/2004 | Robinson et al. | ........... | 424/428 |
| 2004/0208788 A1 * | 10/2004 | Colton | ................ | 422/68.1 |
| 2004/0227075 A1 * | 11/2004 | Liu et al. | ................ | 250/306 |
| 2005/0025778 A1 * | 2/2005 | Cormier et al. | ........... | 424/185.1 |

(Continued)

OTHER PUBLICATIONS

G. Genolet et al., "Soft, entirely photoplastic probes for scanning force microscopy", *Rev. Sci. Instr.* 70(5) (1999) pp. 2398-2401.

(Continued)

*Primary Examiner*—Khanh Nguyen
*Assistant Examiner*—Saeed M Huda
(74) *Attorney, Agent, or Firm*—Foley & Lardner LLP

(57) ABSTRACT

A method disclosed for producing polymer-based cantilevers for use in atomic force microscopy in a batch process. The method includes forming a mold in a mold material, for example PDMS, using a master cantilever, removing the master cantilever from the mold material to reveal a mold cavity, filling the mold cavity with plastic, for example polystyrene, to form a plastic cantilever in the mold, and removing the plastic cantilever from the mold, for example using adhesive tape or flexing the mold. At least one surface of the plastic cantilever can be coated with a reflective metal, such as gold. The plastic cantilever can be functionalized for use in magnetic force microscopy by attaching a probe tip formed of magnetic metal, for example a 10 μm nickel sphere.

25 Claims, 4 Drawing Sheets

U.S. PATENT DOCUMENTS

2007/0008390 A1* 1/2007 Cruchon-Dupeyrat et al. . 347/85

OTHER PUBLICATIONS

G. Genolet et al., "Micromachined photoplastic probe for scanning near-field optical microscopy", *Rev. Sci. Instr.* 72(10) (2001) pp. 3877-3879.

Madou, Marc J., "Fundamentals of Microfabrication: The Science of Miniaturization", $2^{nd}$ edition, Boca Raton, FL: CRC Press, 2002, pp. 63-65.

K.S. Kim et al., "Polydimethylsiloxane (PDMS) for High Aspect Ratio Three-dimensional MEMS", *2000 International Symposium on Mechatronics and Intelligent Mechanical System for 21 Century* (ISIM 2000), Oct. 4-7, 2000, KyongSangNam-Do, Korea.

David S. Grierson et al., "Nanotribology of High Performance Amorphous Carbon Films: The Effect of Annealing," presented at APS Conference (2005).

* cited by examiner 2 micron 200 micron

PLASTIC CANTILEVERS FOR FORCE MICROSCOPY

REFERENCE TO GOVERNMENT RIGHTS

This invention was made with United States government support awarded by the following agencies: USAF/AFOSR F49620-03-1-0420. The United States has certain rights in this invention.

FIELD OF THE INVENTION

The present invention relates generally to a device and method for producing cantilevers for atomic force microscopy and, more particularly, to a device and method for producing polymer-based cantilevers in a batch process.

BACKGROUND OF THE INVENTION

The advent of scanning force microscopy (SFM), also known as atomic force microscopy (AFM), has brought an instrument capable of microscopic surface studies with atomic resolution, suited for ambient and liquid environments and a wide variety of samples. SFM is a method for observing nanoscale topography and other properties of a surface. In general, SFM scans a force sensor over a surface.

SFM can be carried out in contact and non-contact modes. In a contact mode of operation, a topographical image is produced by measuring the deflection of a small cantilever beam extending from a mount end to a tip end bearing a sharp probe. Higher areas of the surface deflect the cantilever more. This deflection is typically detected by reflecting a laser beam off of the back of the cantilever onto a photodiode that is connected to provide its output signal to a computer, which converts the signal into a number. SFM can also be carried in an intermittent contact mode, in which the tip is brought closer to the sample than in a full non-contact mode so that at the bottom of its travel the tip just barely hits the sample.

SFM can be operated in either a constant height mode or a constant force mode. In a constant height mode, the height of the scanner is constant and the cantilever deflection can be used directly to generate the topographical data. In a constant force mode, the height of the probe above the surface is adjusted until the cantilever deflection value reaches a setpoint. The image is generated from the scanner height data. As the cantilever probe scans the surface, an image is produced based on the height of the scanner, pixel by pixel, with the darkness of each pixel representing the height data at that pixel.

Non-contact modes differ from the contact mode in that the cantilever is typically driven to oscillate, typically at its resonant frequency, and the amplitude, phase or frequency or a combination of these parameters is measured, e.g., by a laser beam and photodiode. As the probe approaches the surface, the amplitude of cantilever oscillation or the resonant frequency of the cantilever beam changes due to interactions with the surface. A feedback loop adjusts the height of the scanner to keep the cantilever vibrational amplitude or the cantilever vibrational frequency at a constant value, which also maintains the average tip to sample distance constant, and the height of the scanner at each data point in the scan over the surface is recorded. The low force applied to the sample in the non-contact mode makes it particularly useful for imaging soft samples, for example, DNA-protein complexes.

The cantilever beams and attached probe tips used in SFM are subject to wear and tear during use, especially in contact or intermittent contact modes where the probe tip repeatedly contacts the sample. For this reason, the cantilever beams and probe tips must be replaced from time to time. Although commercial replacement cantilever tips are widely available, most replacement tips are produced in clean rooms using a microlithography process similar to that used to make semiconductor chips. These types of processes are relatively expensive, so that commercially available replacement tips typically cost at least $100 for a single replacement cantilever tip. Consequently, the cost of replacement cantilever tips can be a barrier, especially in educational or research settings.

Most commercially available replacement cantilever tips are formed of silicon or silicon nitride. These materials are relatively brittle and inflexible, making them relatively susceptible to damage during use compared to other materials, such as plastics, which are more pliable. These materials are also opaque, so they obscure the sample area being imaged more than other materials, such as plastics, which can be transparent or translucent. The electrical properties of these materials can also cause problems in some applications, compared to other materials, such as plastics, which are electromagnetically insulating. Although there have been a few reports of the use of plastic probes for scanning force microscopy, replacement plastic cantilevers are not widely available commercially.

Thus, there is a need for a device and method which can produce plastic cantilevers for scanning force microscopes quickly, economically, and reliably. What is further needed is a method that can produce large numbers of such plastic cantilevers in a batch process. What is further needed is a method that can produce plastic cantilevers that are durable and electromagnetically insulating. What is further needed is a method that can produce plastic cantilevers that are adapted for magnetic force microscopy.

SUMMARY OF THE INVENTION

An exemplary embodiment of the invention relates to a method for economically and reliably manufacturing plastic cantilevers having probe tips, for example to be used in scanning force microscopy or magnetic force microscopy.

In a preferred embodiment, the method includes providing a master cantilever having a tip, covering the master cantilever with a mold material, removing the master cantilever from the mold material to reveal a mold cavity, filling the mold cavity with plastic material to form a plastic cantilever having a tip, and removing the plastic cantilever from the mold cavity.

In a particularly preferred embodiment, the mold material comprises polydimethylsiloxane and the plastic cantilever material comprises polystyrene.

In a particularly preferred embodiment, the step of covering the master cantilever with a mold material includes pouring liquid mold material onto the master cantilever with the tip of the master cantilever extending into the liquid mold material and then curing the liquid mold material into a solid mold material by placing the mold material with the embedded master cantilever into a vacuum and placing the mold material with the embedded master cantilever into an oven having a temperature of about 110° C. for about 40 minutes.

In a particularly preferred embodiment, the method further comprises attaching a nickel ball approximately 10 μm in diameter to the end of the plastic cantilever.

In particularly preferred embodiments, the step of removing the master cantilever and/or the plastic cantilever from the mold material includes attaching tape having at least one adhesive surface to the master cantilever, and/or flexing or twisting the mold material.

In particularly preferred embodiments, multiple master cantilevers can be embedded into mold material, to form multiple mold cavities, whereby a plurality of plastic cantilevers can be formed in a batch process.

In particularly preferred embodiments, the plastic cantilever can be coated with a reflective metal, for example 20 nm of gold.

Polymeric (plastic) cantilevers present several advantages as compared to silicon or silicon nitride cantilevers. Polystyrene is one type of plastic that can be used for a plastic cantilever, because it is mechanically compliant, electromagnetically inert, and capable of reproducing very fine features when molded. Plastic cantilevers can work better, because they are generally more compliant and thus more sensitive to force. A plastic cantilever will generally bend on contact, instead of deforming the sample. This can enhance imaging of biological and soft materials, by reducing distortion of the soft sample.

Plastic cantilevers can also be less expensive to manufacture using a process according to the invention, compared to processes for manufacturing silicon or silicon nitride cantilevers. A process according to the invention can be performed without requiring a clean room, using commonly available and inexpensive materials, and with cycle times on the order of 4 hours. A process according to the invention can dramatically reduce the cost of replacement cantilevers, enabling new medical or biological applications in which the replacement cantilevers are disposable.

While plastic cantilevers themselves are electromagnetically inert, they can be combined with magnetic or electronically conductive materials to form composite structures that are adapted for particular applications. For example, combining a plastic cantilever formed of electromagnetically inert material with a sharp microwave probe tip can allow for the detection of differences in the dielectric of materials such as cells for cancer detection. Similarly, a magnetic ball can be mounted on, or embedded in, the tip of a plastic cantilever that is otherwise magnetically inert, for low noise measurement of magnetic forces in magnetic force microscopy. Portions of a plastic cantilever can also be chemically doped, coated with other materials, or otherwise functionalized for particular applications.

Other principal features and advantages of the invention will become apparent to those skilled in the art upon review of the following drawings, the detailed description, and the appended claims.

DETAILED DESCRIPTION OF THE PREFERRED EMBODIMENTS

Figure 1:
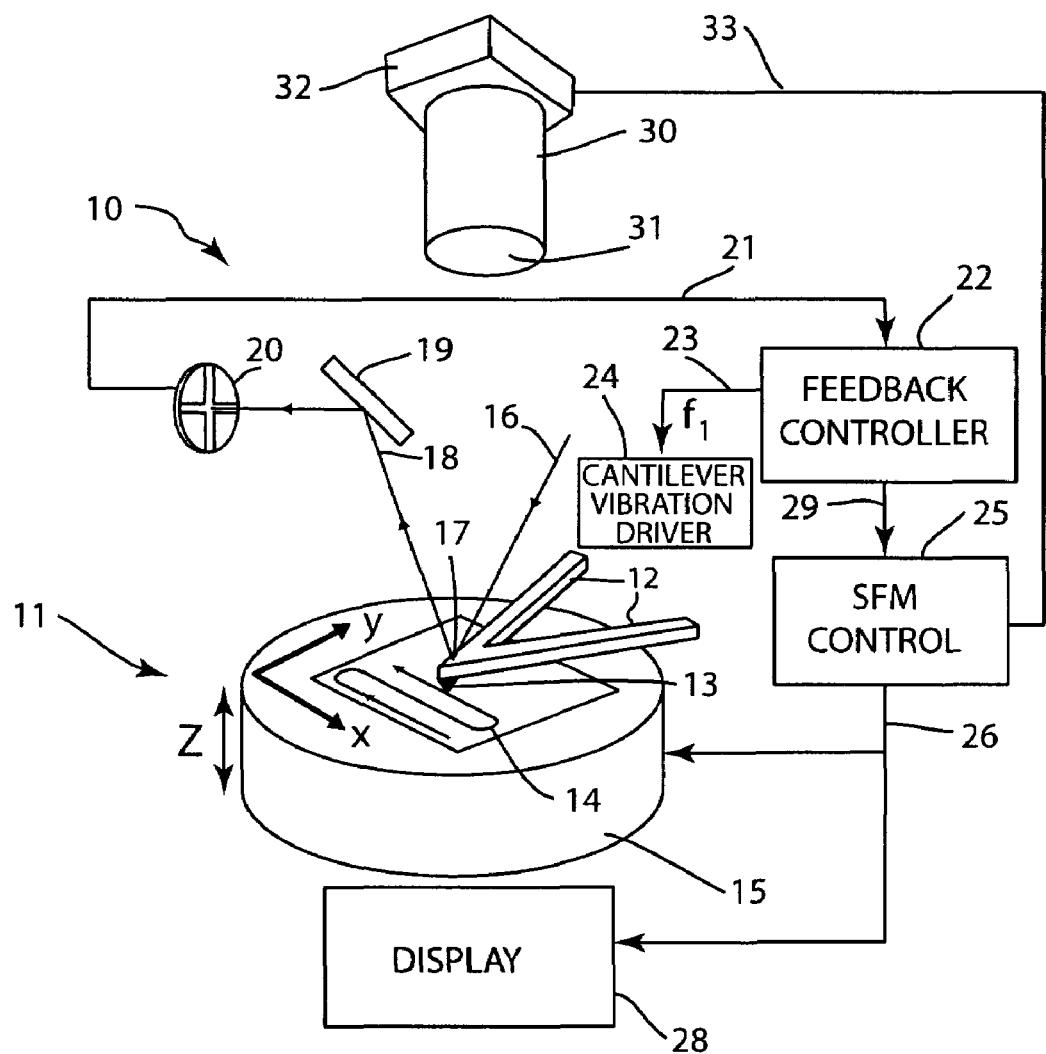
FIG. 1 is a simplified view of an exemplary scanning force microscope ("SFM") system.

Referring to the figures, FIG. 1 is a simplified view of an exemplary scanning force microscope ("SFM") system, shown generally at 10, which includes a scanning force microscope, shown generally at 11, having a cantilever beam 12 according to the invention that includes a scanning tip 13. The cantilever beam 12 supports the scanning tip 13 over a sample 14 supported on a scanner stage 15 that can be operated to translate the sample 14 in X, Y and Z directions, as illustrated in FIG. 1, with the Z direction being in a direction toward or away from the tip 13. Such an exemplary scanning force microscope system is described, for example, in U.S. Patent Application Publication No. 2004/0182140, the contents of which are incorporated by reference.

In the exemplary scanning force microscope system 10, the position and movement of the tip 13 and cantilever beam 12 can be monitored, for example, by reflecting a laser beam 16 off of the back surface 17 of the cantilever 12 and/or tip 13. The reflected beam 18 can be deflected by a mirror 19 to a detector 20 to provide an output signal on a line 21 to a feedback controller 22. The feedback controller 22 can provide an output signal on a line 23 at a frequency $f_1$ to a cantilever vibration driver 24 that is coupled to the cantilever beam 12 to vibrate the beam 12 at the drive frequency $f_1$, and to provide output signals on lines 29 to an SFM control 25.

X, Y and Z control signals can be provided from the SFM control on lines 26 to the scanning stage 15, and the signals on the lines 26 can also be provided to a monitor 28 that utilizes the X, Y and Z signals to generate a three-dimensional image that may be displayed to a user, for example, by a video display, liquid crystal display, etc.

As the feedback controller 22 controls the scanner 15 to scan the sample with respect to the vibrating tip 13 in the X and Y directions to scan over the surface of the sample, the feedback controller provides a Z axis control signal to the scanner stage 15 to maintain the height of the tip above the sample substantially constant. This Z axis control signal is thus proportional to the height of the sample at each X and Y position as the tip 13 is scanned over the sample, and the Z axis signal thus can be utilized to generate a three-dimensional image which is shown on the display device 28.

The scanning force microscope system 10 may include an optical viewfinder 30 having a lens 31 to provide a visual image of the sample 14, cantilever beam 12, and tip 13. This visual image can be provided directly and optically to a user, for example through an eyepiece, or using an electronic imaging device 32 to provide an output signal on lines 33 to the SFM control 25. This visual image, if provided, can be used for positioning the sample underneath the cantilever beam 12 and tip 13 before scanning the sample.

It is understood that the scanning force microscope may be implemented in other manners, for example, with the cantilever beam 12 mounted for Z axis displacement and with the scanning stage 15 utilized to scan the sample in the X and Y directions, or the sample 14 may be maintained stationary and the cantilever beam 12 may be mounted for scanning in X, Y and Z directions.

Figure 2A:
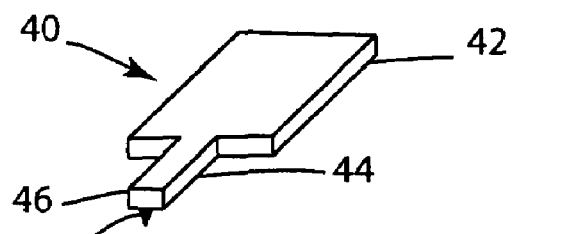
FIGS. 2(a)-2(e) depict the steps in an exemplary method for producing a plastic cantilever according to the invention.
Figure 2B:
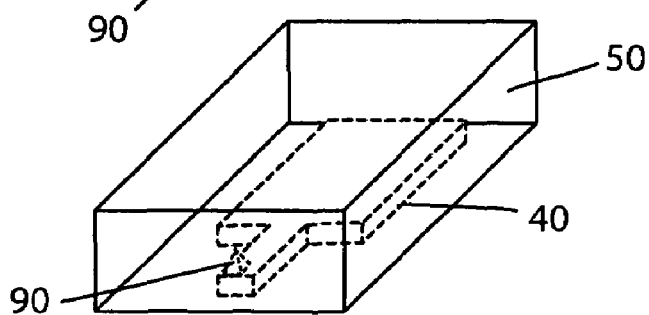
Figure 2C:
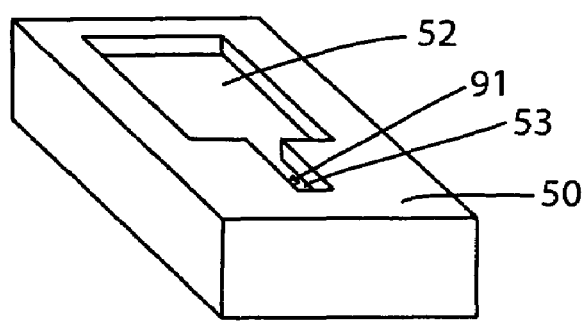
Figure 2D:
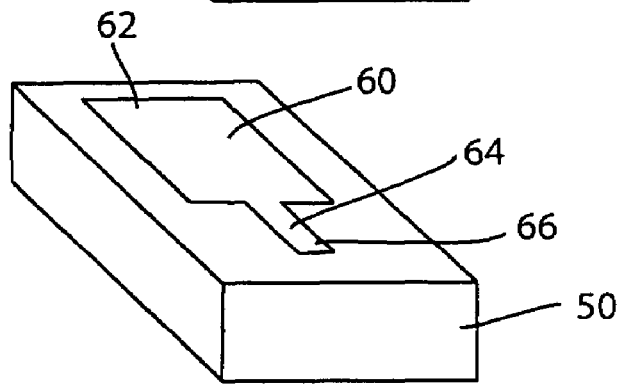
Figure 2E:
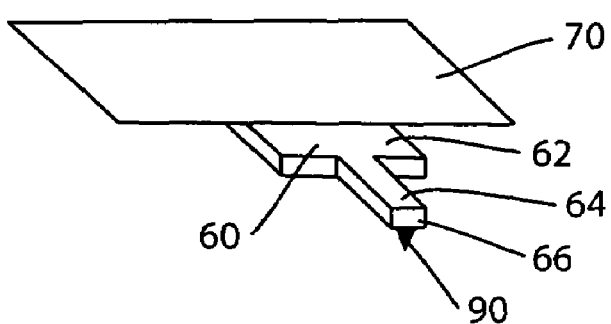

FIGS. 2(a)-2(e) depict the steps in an exemplary method for producing a plastic cantilever according to the invention. FIG. 2(a) shows a master cantilever 40 which is used as a template for the plastic cantilevers to be formed. The master cantilever 40 can be obtained, for example, by purchasing a commercially available replacement cantilever made of silicon or silicon nitride from a supplier such as Veeco Probes of Santa Barbara, Calif. The master cantilever 40 can also be custom manufactured from silicon or silicon nitride using conventional methods. The master cantilever 40 can include, for example, a mount portion 42 connected to a shaft portion 44 that extends to a tip portion 46 that includes a tip 90.

FIG. 2(*b*) shows how a mold for producing a plastic cantilever can be formed by embedding the master cantilever 40 in a suitable mold material 50. A preferred mold material 50 is an elastomeric polymer such as polydimethylsiloxane ("PDMS") available from Dow-Corning under the name Sylgard 184. The mold material 50 can be prepared in liquid form by mixing in a 10:1 ration the pre-polymer material with a curing agent. The liquid mold material 50 is then poured onto the master cantilever 40 (for example placed on a flat metal surface), with the tip 90 of the master cantilever 40 extending into the mold material 50. The mold material 50 with the master cantilever 40 embedded is preferably placed in a vacuum for 30 minutes to draw off any outgassing, and then placed in an oven at 110° C. for 40 minutes to solidify. Of course, other suitable materials can be used instead of PDMS, and the processing steps can be adjusted accordingly.

FIG. 2(*c*) shows the resulting cantilever mold cavity 52 formed in the cantilever mold material 50 after the master cantilever 40 has been removed. The majority of the cantilever mold cavity 52 is typically about 7 µm deep, and includes a tip portion 53 which includes a tip cavity 91 which extends into the mold material 50.

FIG. 2(*d*) shows the cantilever mold cavity 52 filled with a suitable liquid plastic material for a plastic cantilever 60 according to the invention. The plastic cantilever 60 typically includes a mount portion 62, an elongated shaft portion 64, and a tip portion 66. A suitable liquid plastic material is polystyrene dissolved in 1 M toluene at a 1:3 ratio to form a slurry which can be spread into the cantilever mold cavity 52 including the tip cavity 91. The filled mold is preferably then heated to a temperature of about 185° C. and compressed, for example with a heavy weight or a mechanical clamp, to remove structural imperfections such as bubbles.

FIG. 2(*e*) shows the plastic cantilever 60 removed from the mold using a plastic cantilever transport handle 70. Double stick tape is a preferred material for use as a plastic cantilever transport handle, although other materials can be used such as single sided adhesive tape or a needle.

Figure 3:
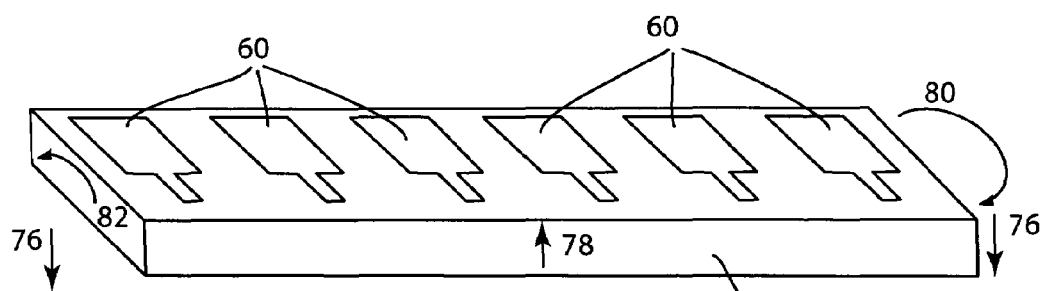
FIG. 3 is a simplified view of an exemplary mold for producing a plurality of plastic cantilevers according to the invention.

FIG. 3 shows a multi-cantilever mold 74, extending the method of FIGS. 2(*a*)-2(*e*) to produce a plurality of plastic cantilevers 60 in a batch process according to the invention. FIG. 3 also shows how the plastic cantilevers 60 can be removed from the mold 74 by flexing the ends of the mold material 74 in a first flex direction 76 and a second flex direction 78, or by twisting the ends of the mold material 74 in a first twist direction 80 and a second twist direction 82. The twist or flex technique can be used with or without the use of a plastic cantilever transport handle 70 to remove the plastic cantilevers 60 from the mold 74. The twist or flex technique can also be used with or without the use of a transport handle 60 to remove one or more master cantilevers from the multi-cantilever mold 74.

Figure 4:
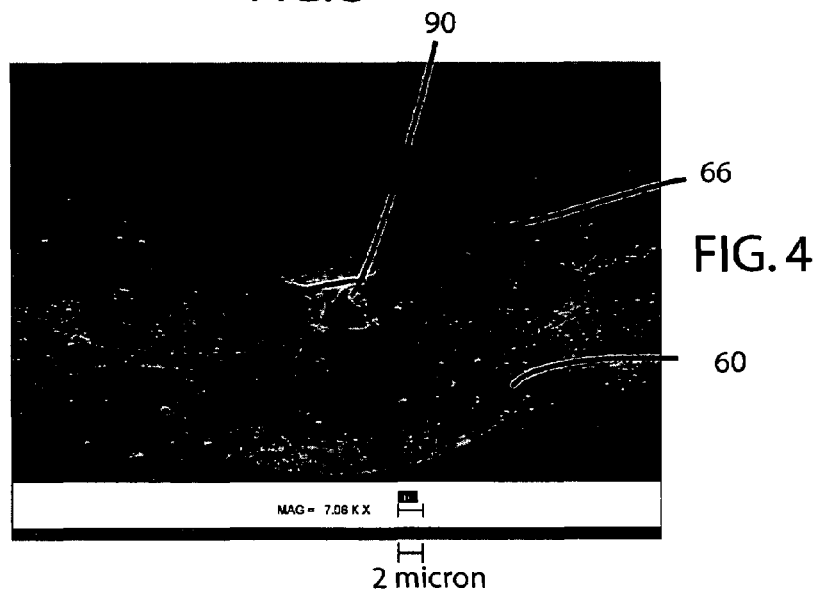
FIG. 4 is a top perspective view of the tip of a plastic cantilever produced according to the invention.

FIG. 4 is a top perspective view of the tip portion 66 and tip 90 of a plastic cantilever 60 produced according to the invention. The tip 90 shown in FIG. 4 is approximately 100 nm in radius.

Figure 5:
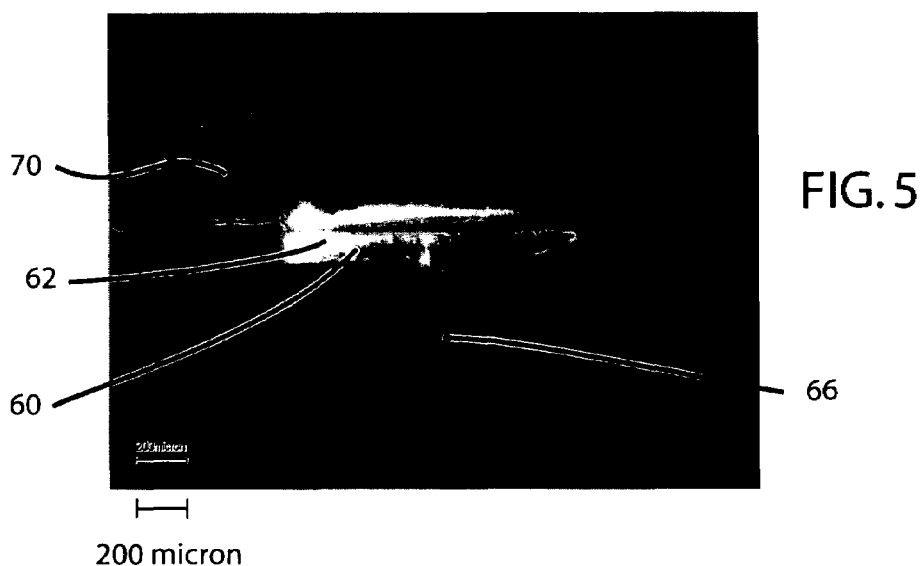
FIG. 5 is a top plan view of a plastic cantilever produced according to the invention.

FIG. 5 is a top plan view of a plastic cantilever 60 produced according to the invention attached to a plastic cantilever transport handle 70. The plastic cantilever 60 includes a mount portion 62, a shaft portion 64, and a tip portion 66. In FIG. 5, the tip 90 is on the other side of the tip portion 66, and so is not shown.

Figure 6:
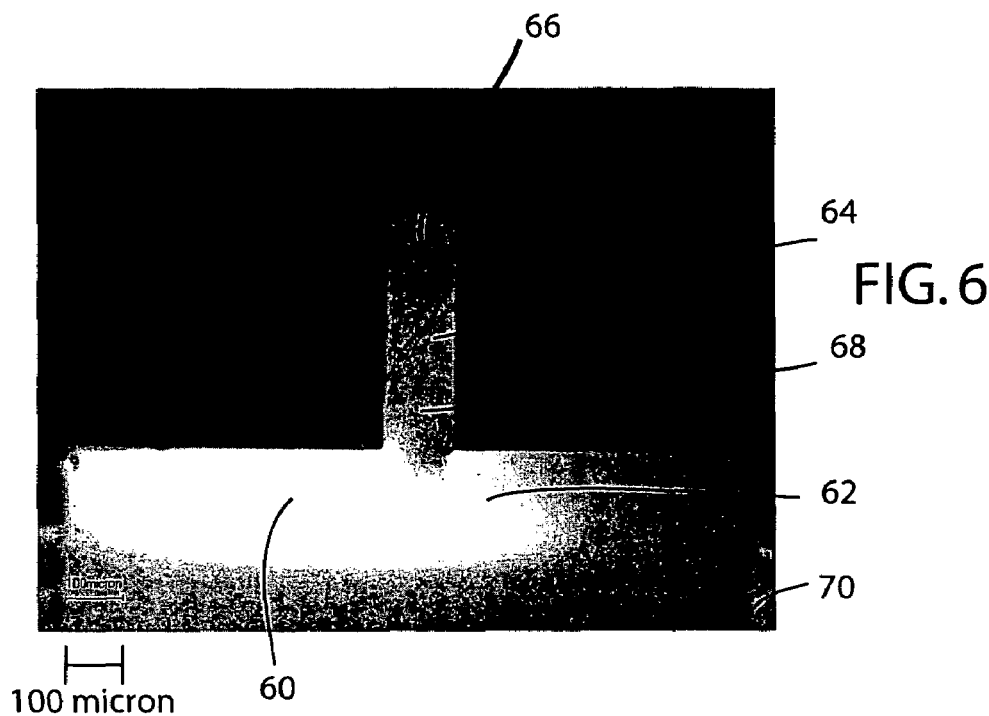
FIG. 6 is a top plan view of a plastic cantilever produced and coated with 20 nm of gold according to the invention.

FIG. 6 is a top plan view of a plastic cantilever 60 produced according to another aspect of the invention. In FIG. 6, the plastic cantilever tip 90 has been coated with a reflective surface comprising 20 nm of gold, although other reflective surfaces can be used. A laser can be reflected off of this reflective surface when the plastic cantilever is used in a scanning force microscope.

Figure 7:
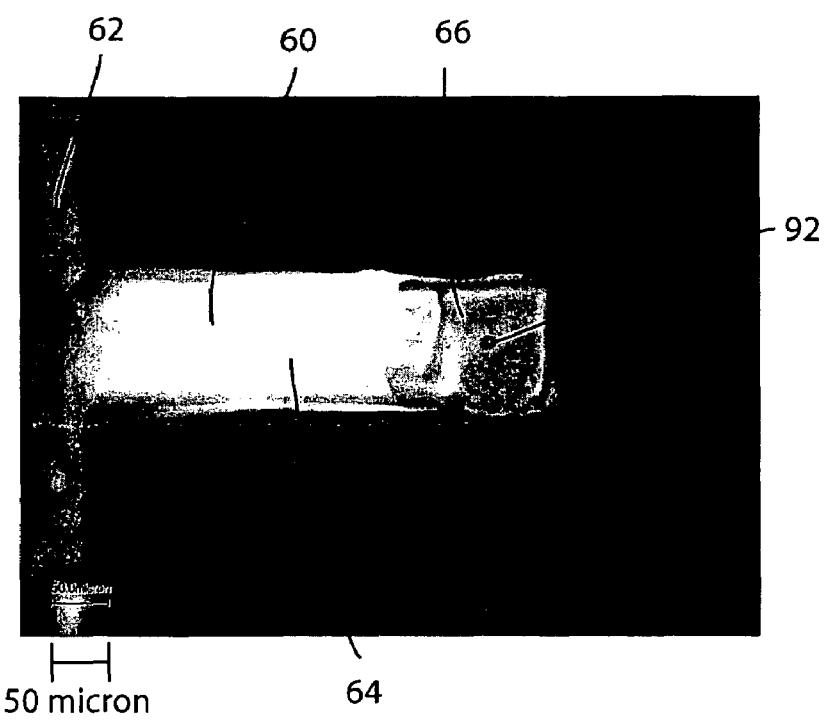
FIG. 7 is a plan view of a plastic cantilever produced and functionalized with a magnetic ball tip according to the invention.

FIG. 7 is a plan view of a plastic cantilever 60 produced and functionalized with a magnetic ball tip 92 according to another aspect of the invention. In this aspect of the invention, the plastic cantilever 60 includes a magnetically sensitive tip, such as a 10 µm nickel ball, for use as a magnetic force microscopy (MFM) cantilever. A plastic cantilever 60, for example formed of polystyrene, functionalized in this fashion and used as a cantilever for magnetic force microscopy can have less magnetic interference as compared with traditional silicon MFM probes, thereby enhancing signal to noise.

It is important to note that the construction and arrangement of the elements of the master cantilever 40, the cantilever mold cavity 52, plastic cantilever 60, and other structures shown in the exemplary embodiments discussed herein are illustrative only. Those skilled in the art who review this disclosure will readily appreciate that many modifications are possible (e.g., variations in sizes, dimensions, structures, shapes and proportions of the various elements, values of parameters, mounting arrangements, materials, transparency, color, orientation, etc.) without materially departing from the novel teachings and advantages of the invention.

Further, while the exemplary application of the device is in the field of scanning force microscopy, the invention has a much wider applicability. For example, a plastic cantilever produced according to the invention can be adapted for magnetic force microscopy by incorporating a magnetically sensitive tip, such as a nickel magnetic ball.

The particular materials used to construct the exemplary embodiments are also illustrative. For example, although the plastic cantilever in the exemplary embodiment is preferably made of polystyrene, other plastic or polymer materials having suitable properties could be used. Although the mold material in the exemplary embodiment is preferably made of PDMS, other metal, plastic, or polymer materials having suitable properties could be used. Although the magnetic tip in the exemplary embodiment is preferably made of nickel, other magnetic materials or metals having suitable properties could be used. All such modifications, to materials or otherwise, are intended to be included within the scope of the present invention as defined in the appended claims.

The order or sequence of any process or method steps may be varied or re-sequenced according to alternative embodiments. Other substitutions, modifications, changes and/or omissions may be made in the design, operating conditions and arrangement of the preferred and other exemplary embodiments without departing from the spirit of the present invention as expressed in the appended claims.

The components of the invention may be mounted to each other in a variety of ways as known to those skilled in the art. As used in this disclosure and in the claims, the terms mount and attach include embed, glue, join, unite, connect, associate, hang, hold, affix, fasten, bind, paste, secure, bolt, screw, rivet, solder, weld, and other like terms. The term cover includes envelop, overlay, and other like terms.

It is understood that the invention is not confined to the embodiments set forth herein as illustrative, but embraces all such forms thereof that come within the scope of the following claims.

What is claimed is:

1. A method for producing plastic cantilevers, comprising:
   (a) providing a master cantilever having a tip;
   (b) covering the master cantilever with a mold material, with the tip of the master cantilever extending into the mold material;
   (c) removing the master cantilever from the mold material to reveal a mold cavity having a tip forming cavity;
   (d) filling the tip forming cavity with a tip material and filling the remainder of the mold cavity with a plastic cantilever material to form a plastic cantilever having a tip formed of the tip material; and
   (e) removing the plastic cantilever and tip from the mold cavity and tip forming cavity
   wherein the plastic cantilever having a tip has a shaft portion and the tip extends downwardly from the plane defined by the shaft portion such that the plastic cantilever is adapted for use in force microscopy, and further wherein the step of covering the master cantilever with a mold material includes pouring liquid mold material onto the master cantilever and then curing the liquid mold material into a solid mold material.

2. The method of claim 1, wherein the mold material comprises polydimethylsiloxane, wherein the plastic cantilever material comprises polystyrene, and wherein the tip material and plastic cantilever material are the same material.

3. The method of claim 1, wherein the step of curing the liquid mold material into a solid mold material includes placing the mold material with the embedded master cantilever into a vacuum for a first period of time and placing the mold material with the embedded master cantilever into an oven having a temperature above 50° C. for a second period of time greater than ten minutes.

4. The method of claim 3, wherein the temperature of the oven is about 110° C. and the second period of time is about 40 minutes.

5. The method of claim 4, wherein the liquid mold material comprises polydimethylsiloxane, wherein the plastic cantilever material comprises polystyrene, and the tip material comprises polystyrene.

6. The method of claim 4, wherein the liquid mold material comprises polydimethylsiloxane, wherein the plastic cantilever material comprises polystyrene, and the tip material comprises a magnetic metal.

7. The method of claim 6, wherein the tip material comprises a nickel ball approximately 10 μm in diameter.

8. The method of claim 1, wherein the step of removing the master cantilever from the mold material includes attaching a cantilever transport handle to the master cantilever.

9. The method of claim 8, wherein the cantilever transport handle comprises tape having at least one adhesive surface.

10. The method of claim 1, wherein the step of removing the master cantilever from the mold material includes flexing or twisting the mold material.

11. The method of claim 1, wherein the step of removing the master cantilever from the mold material includes attaching a cantilever transport handle to the master cantilever and flexing or twisting the mold material.

12. The method of claim 1, wherein the step of removing the plastic cantilever from the mold material includes attaching a cantilever transport handle to the plastic cantilever.

13. The method of claim 12, wherein the cantilever transport handle comprises tape having at least one adhesive surface.

14. The method of claim 1, wherein the step of removing the plastic cantilever from the mold material includes flexing or twisting the mold material.

15. The method of claim 1, wherein the step of removing the plastic cantilever from the mold material includes attaching a cantilever transport handle to the plastic cantilever and flexing or twisting the mold material.

16. The method of claim 1, further comprising the step of coating at least a portion of at least one surface of the plastic cantilever with reflective metal.

17. A method for producing a plurality of plastic cantilevers, comprising:
   (a) providing a plurality of master cantilevers, each master cantilever having a tip;
   (b) covering the plurality of master cantilevers with a mold material, with the tip of each master cantilever extending into the mold material;
   (c) removing the plurality of master cantilevers from the mold material to reveal a plurality of mold cavities, each mold cavity having a tip forming cavity;
   (d) filling each tip forming cavity with a tip material and filling the remainder of each mold cavity with plastic cantilever material to form a plurality of plastic cantilevers each having a tip formed of the tip material; and
   (e) removing the plurality of plastic cantilevers each having a tip from the mold cavities
   wherein the plastic cantilevers having a tip have a shaft portion and the tips extend downwardly from the plane defined by the shaft portion such that the plastic cantilevers are adapted for use in force microscopy, and further wherein the step of covering the plurality of master cantilevers with a mold material includes pouring liquid mold material onto the plurality of master cantilevers and then curing the liquid mold material into a solid mold material.

18. The method of claim 1, wherein the tip of the plastic cantilever is perpendicular to the plane defined by the shaft portion.

19. The method of claim 17, wherein the tips of the plastic cantilevers are perpendicular to the plane defined by the shaft portion.

20. The method of claim 1, wherein the plastic cantilever comprises a single tip.

21. The method of claim 17, wherein the plastic cantilevers each comprise a single tip.

22. The method of claim 1, wherein the tip material comprises a nickel ball approximately 10 μm in diameter.

23. The method of claim 17, wherein the tip material comprises a nickel ball approximately 10 μm in diameter.

24. The method of claim 1, wherein the liquid mold material comprises a polymer.

25. The method of claim 17, wherein the liquid mold material comprises a polymer.

* * * * *